US006142373A

United States Patent [19]

Claassen

[11] Patent Number: 6,142,373

[45] Date of Patent: Nov. 7, 2000

[54] PROCESS FOR REMOVING ITEMS FROM A CUPBOARD AND CUPBOARD FOR IMPLEMENTING THE PROCESS

[75] Inventor: Henning J. Claassen, Lüneburg, Germany

[73] Assignee: Chemcoat, Inc., Fairburn, Ga.

[21] Appl. No.: 09/091,425

[22] PCT Filed: Nov. 28, 1996

[86] PCT No.: PCT/EP96/05274

§ 371 Date: Jun. 24, 1998

§ 102(e) Date: Jun. 24, 1998

[87] PCT Pub. No.: WO97/24700

PCT Pub. Date: Jul. 10, 1997

[30] Foreign Application Priority Data

Dec. 29, 1995 [DE] Germany ........................... 195 49 115

[51] Int. Cl.[7] ........................................ G06K 15/00

[52] U.S. Cl. ........................................ 235/383; 235/380

[58] Field of Search ................................ 235/381, 380, 235/383; 194/217

[56] References Cited

U.S. PATENT DOCUMENTS

| | | | |
|---|---|---|---|
| 4,108,363 | 8/1978 | Susumu . | |
| 4,508,812 | 4/1985 | Brault . | |
| 5,147,021 | 9/1992 | Maruyama et al. | 194/217 |
| 5,892,211 | 4/1999 | Davis et al. | 235/381 |

FOREIGN PATENT DOCUMENTS

| | | |
|---|---|---|
| 2 620 842 | 3/1989 | France . |
| 26 23 941 | 12/1976 | Germany . |
| 37 41 053 | 6/1988 | Germany . |

*Primary Examiner*—Karl D. Frech

*Attorney, Agent, or Firm*—Armstrong, Westerman, Hattori, McCleland, & Naughton

[57] ABSTRACT

The invention relates to a process for removing items from a cupboard, in which a given item is first selected and then removed from the cupboard. Information on the selected and removed items is recorded by mans of a plug-in storage medium and also in the cupboard. The invention also relates to a cupboard for implementing the process having a device for storing items, apertures for their removal and locking devices for the apertures. There are recording devices on the cupboard for providing information on the items selected or removed, where such information can be displayed by a control device on a storage medium inserted into an aperture and in the cupboard.

17 Claims, 3 Drawing Sheets

PROCESS FOR REMOVING ITEMS FROM A CUPBOARD AND CUPBOARD FOR IMPLEMENTING THE PROCESS

The invention relates to a method for removing articles from a cabinet of the kind as defined by the preamble of claim 1, as well as to a cabinet for performing said method.

A variety of different kinds of cabinets or methods for removing articles from such cabinets is known which find application more particularly in hotel operations.

Thus, for example, simple refrigerator cabinets are installed in hotel rooms from which all articles therein can be removed after the refrigerator door has been opened. The disadvantage here, however, is that no means exist for immediately checking or invoicing articles removed from the refrigerator to the patron. In addition to this, restocking the refrigerator after the patron has checked out is highly personnel-intensive since the articles remaining need to be counted and the articles removed need to be restocked. Furthermore, it is to be feared with this kind of removal that not all articles removed are paid for; for instance, some articles may have been stolen or bottles of drinks refilled with tap water to sham a still full bottle.

Also known is a method for removing articles from the compartments of a cabinet comprising a large number of lockable single compartments. Each compartment door or article contained in the compartment is signalled electronically to a central invoicing system of the hotel. Thus, opening the locked compartment or vending an article is automatically booked in the invoicing system of the hotel for presentation to the patron on checking out.

The drawback here is that all refrigerator cabinets need to hooked up to the invoicing system which makes for high installation costs. In addition to this the space, required by such a cabinet is relatively large since it involves a large number of lockable single as well as just as many single doors, all of which in turn need to be fitted with sensors.

Disclosed by DE-OS 26 23 941 is a vending machine having locked, separate compartments, the locking mechanism of which can be released by insertion of a kind of credit card. When articles are removed, holes are punched at defined positions in the card by a puncher. Handing in this credit card informs personnel as to which compartments need to be restocked. However, the mechanical configuration of this machine is highly complicated.

Furthermore, a vending machine is disclosed by FR-A-2 620 842 in which information as to removed articles—in this case a video cassette—is stored in an electronic memory of the machine; although this system requires the customer to use an insertable storage medium, a kind of code card, this merely serves to document access authorization and contains, for example, a subscriber code.

DE-A-37 41 053 discloses a dispenser incorporating a slot for receiving a cheque card on which information as to a removed article, namely the price thereof, is stored until this amount is updated by the next cumulative amount.

In using the vending machine as it reads from U.S. Pat. No. 4,508,812 the customer enters an ID number either via the keypad provided for this purpose or with the aid of an ID card which, when desired by the customer, may also be personalized to prevent misuse of the card should it be lost. In addition, a variety of recordings relating to each customer, article or sale are made in a computer of this vending machine.

In conclusion, a method for removing articles from a cabinet in keeping with the preamble of claim 1 reads from U.S. Pat. No. 4,108,363. For this purpose a purchase card is inserted in a slot of a sales cabinet to gain access to the interior of the cabinet through a door. When this door is closed, information as to the removed articles is automatically memorized on the purchase card.

Apart from this, a "computor" is provided in this sales system which is connected to a weigher on which the items for sale are located in the cabinet. From the difference in weight of the items before and after removal the computor 21 is able to compute the sales weight and thus the sales price of the item concerned so that the corresponding information can be recorded on the purchase card.

This system is unsuitable for restocking such a cabinet in a hotel room, however, since—on the one hand—there is no need for the "computor", thus making it superfluous, and—on the other—this fails to solve the problem of restocking the cabinet by simple and cost-effective means after removal of such items as drinks or goodies and the like.

The object of the present invention is to propose a method for removing articles from compartments of a cabinet of the aforementioned kind as well as a cabinet for performing this method, which obviates the above-cited drawbacks. More particularly, the intention is to define a method which can be implemented at relatively low cost, together with a cabinet which is suitable for implementing the method and featuring a comparatively simple configuration.

This object is achieved by the method as set forth in claim 1 and by a cabinet as set forth in claim 9.

Expedient embodiments read from the features as set forth in the sub-claims.

The advantages achieved by the invention are based on the following functions: by registering the information on the selected or removed articles on an insertable customer data storage medium, more particularly a chip or magnetic card, it is relatively simple for the cabinet operator to see and invoice which articles have been removed from the cabinet as indicated by the customer data storage medium. All that is needed for this purpose is, for example, the chip card or magnetic card to be presented at the reception desk where the information contained therein is read and compiled for invoicing.

In addition, restocking the cabinet after removal of articles is facilitated since the pertinent information obtained from the cabinet concerned is also stored in the cabinet itself. This information can be transferred—for instance by room service—to a service storage card so that it can be immediately recognized which and how many articles have been removed so that restocking presents no problem.

It is particularly preferred that the storage medium is inserted in the cabinet so that operating the cabinet is clearer.

Preferably the articles can be removed from the individual compartments of the cabinet, since the checking of cabinet contents is simplified by this.

In one preferred embodiment the information as to the removed articles, i.e. the consumption, is recorded on the storage medium and in the cabinet, thus enabling the removed articles to be precisely listed which, for one thing, is of advantage in making the invoice and, for another, substantially simplifies restocking the cabinet, since it can be directly established on the cabinet concerned when certain articles are no longer.

number of articles required can be established relatively simply so that it is no longer necessary to hold these articles on stock when restocking.

In accordance with the invention a device for receiving the storage medium is provided for the cabinet, this device not necessarily needing to be arranged on the cabinet itself, it instead being arranged, for example, also at some central location in the room. This would thus also make it possible to use the storage medium not only for operating the cabinet but also e.g. for serving an in-house pay TV system. In addition to this the cabinet configured in accordance with the invention comprises a control device with which information as to the selected or removed articles can be registered on the storage medium and in the cabinet.

It is particularly preferred to arrange cooling assemblies in the cabinet so that the articles contained in the cabinet are cooled and can thus be maintained fresh over lengthy periods; such cooling assemblies also being expedient for chilling drinks.

In a further preferred embodiment the compartments of the cabinet are arranged on a rotary support so that various articles of the individual compartments can be selected by rotating this support.

It is particularly preferred to provide viewing windows in the cabinet so that the customer is able to view the articles contained in the cabinet before deciding on this or that article.

In another preferred embodiment two rotary platforms are provided with compartments stacked thereon so that the customer is presented with a large selection of articles.

It is particularly preferred to configure the control device of the cabinet so that it is capable of receiving a chip card and recording information thereon.

Preferably the cabinet comprises sensors containing information as to articles contained in and/or removed from the cabinet.

Advantageously a display device for displaying the information recorded in the cabinet is provided on the cabinet so that, for example, it can be established, without the need of any expedients, which and how many articles have been vended from the cabinet.

It is furthermore of advantage to provide two lamps differing in color on the cabinet to indicate whether any article at all has been removed from the cabinet, it being particularly advantage in this respect to provide a green lamp on the cabinet to indicate that no article has been removed and a red lamp to indicate that at least one article has been removed from the cabinet.

It is particularly preferred to provide a control device in the cabinet with which the information registered in the cabinet can be written onto a storage medium to be inserted into the cabinet. Accordingly, only one suitable card needs to be inserted into the cabinet by a person charged with the task of restocking the cabinet; the control device in the cabinet being able to “see” that the storage medium involved is not that as described above for removing articles from the cabinet, after which the control device transfers the stored information as to the removed articles to this storage medium. An information for identifying this cabinet may also be transfered to this storage medium so that the person charged with the task of restocking the cabinets can insert this storage medium into a plurality of cabinets for subsequently fetching the precise number of the various articles required from stores on the basis of this storage medium and the information recorded thereon, for example, for the purpose of restocking the cabinets from which articles have been removed.

The invention will now be detained on the basis of a preferred embodiment with reference to the drawings in which.

Figure 1:
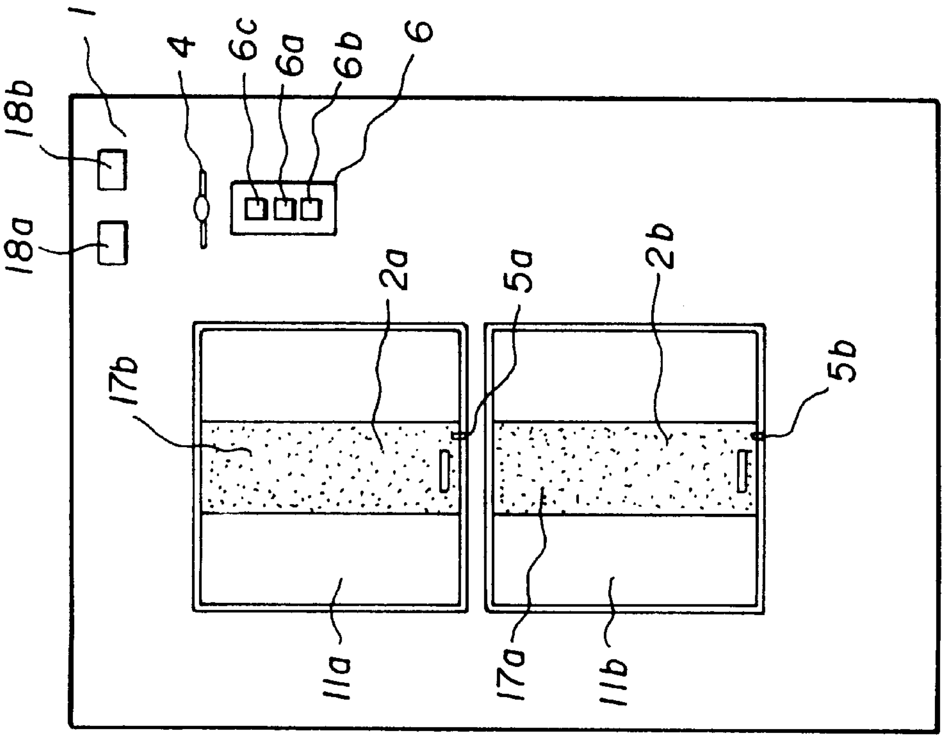
FIG. 1 is a front view of the cabinet in accordance with the invention.

The cabinet 1 as shown in FIG. 1 comprises on its front side two viewing windows 11*a* and 11*b* through which the customer is able to view the articles contained in the cabinet. The viewing windows have openings 2*a* and 2*b* in the middle, in front of which guards 17*a* and 17*b* are arranged. These guards 17*a* and 17*b* are locked by locking devices 5*a* and 5*b* and can be hinged open on being unlocked so that the customer is able to insert his/her hand through the openings 2*a* or 2*b* of the viewing windows 11*a* or 11*b* into the cabinet 1 to remove the desired article. The cabinet 1 comprises furthermore a slot 4 for a chip card as well as a user keypad 6, it being, of course, just as possible to arrange the slot 4 for the chip card and the user keypad 6 separately from the cabinet. The user keypad 6 consists of three keys with which the selection of the desired article to be removed from the cabinet 1 can be made. For this purpose first the user key 6*c* is used to rotate the rotatable platforms 7 (not shown) located in the interior of the cabinet so that the selected article for removal is located behind the guards 17*a* or 17*b*. Subsequently the upper guard 17*a* or lower guard 17*b* can be released by means of the user key 6*a* or 6*b* signalling the locking devices 5*a* or 5*b* accordingly. It can be established from the position of the rotatable platform 7 which article has been selected or removed so that this information can be registered on the inserted storage medium and in the cabinet.

Figure 2:
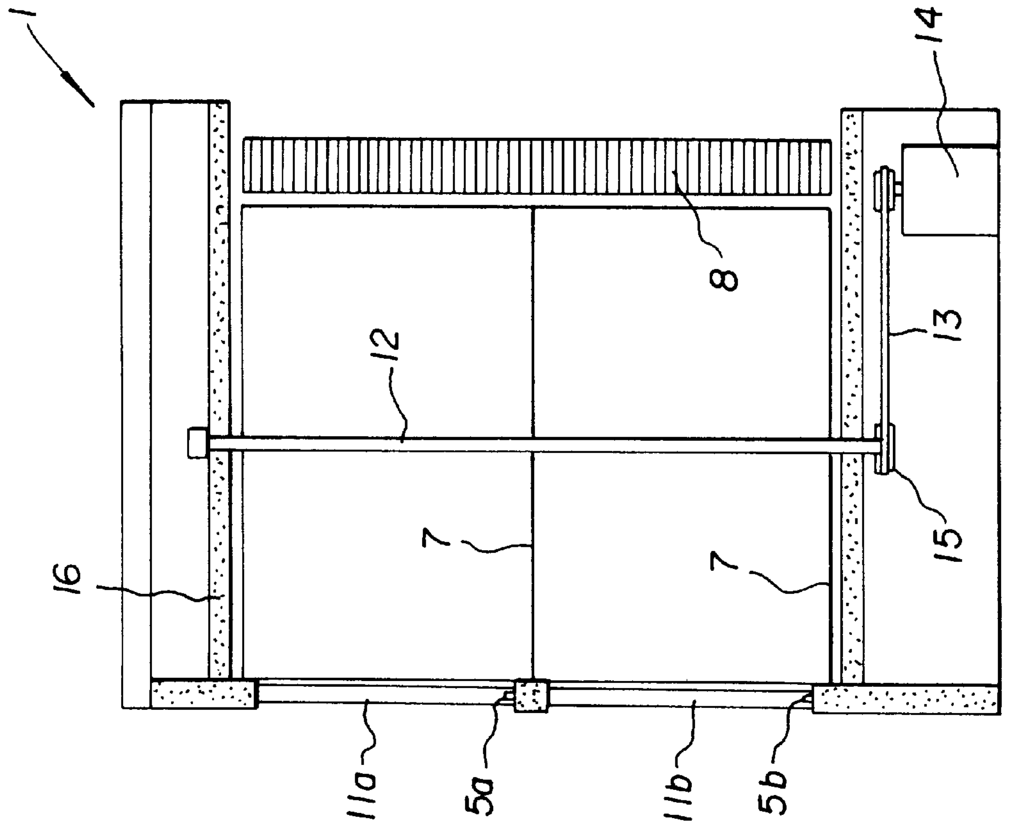
FIG. 2 is a vertical section through the cabinet as shown in FIG. 1.

Referring now to FIG. 2 it is evident that two rotary platforms 7 are disposed one above the other in the interior of the cabinet 1. Passing through the centerpoints of the two platforms 7 perpendicularly is a spindle 12 rotatively mounted in the cabinet 1. The spindle 12 comprises at its bottom end a gearwheel 15 which is connected via a V-belt 13 to a drive motor 14. The drive motor 14 can be signalled by means of the user key 6*c* as described above so that the spindle 12 is turned by the drive motor 14 as long as the user key 6*c* is pressed, it being, of course, just as conceivable to design the drive motor so that the spindle 12 is turned on pressure being applied to the user key 6*c* so that the platform 7 is turned only to the extent that a compartment located adjacent to the compartment parked originally behind the removal openings 2*a* or 2*b* is now located behind this removal opening. It is, of course, just as conceivable to provide other means of signalling the drive motor 14, thus, for instance, by means of two separate keys for counter-clockwise or clockwise rotation. The cabinet 1 comprises on its rear side a cooling assembly 8 and is lined top and bottom with insulating matting 16.

The cabinet 1 comprises at its top right-hand corner a green lamp 18*a* and a red lamp 18*b*. When the cabinet 1 is fully stocked, the green lamp 18*a* is ON. As soon as an article has been removed, however, the green lamp 18*a* is turned OFF and the red lamp 18*b* is ON.

The slot 4 located below the lamps 18*a* and 18*b* serves also to receive chip cards for transferring information stored in the control device of the cabinet 1 as to the nature and quantity of removed articles onto this chip card.

Figure 3:
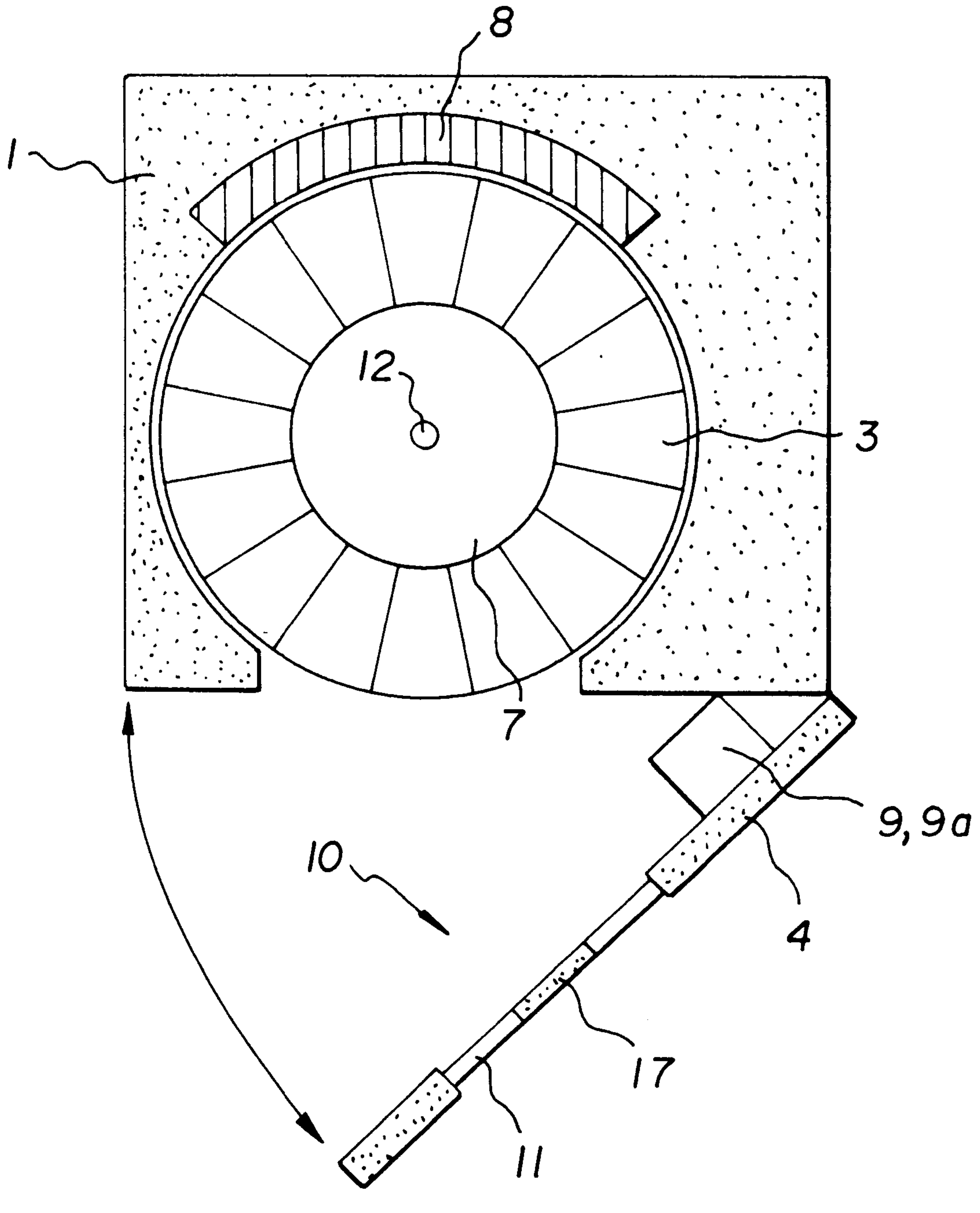
FIG. 3 is a view from above of the cabinet as shown in FIG. 1.

Referring now to FIG. 3 there is illustrated a rotatable platform 7 comprising compartments 3 in which the articles can be deposited. The front panel 10 of the cabinet 1 is hinge-mounted so that it can be opened for filling the compartments 3 or for other service operations. Located in the hinged front panel 10 is the slot 4 together with the electronic control circuit 9.

Figure 4:
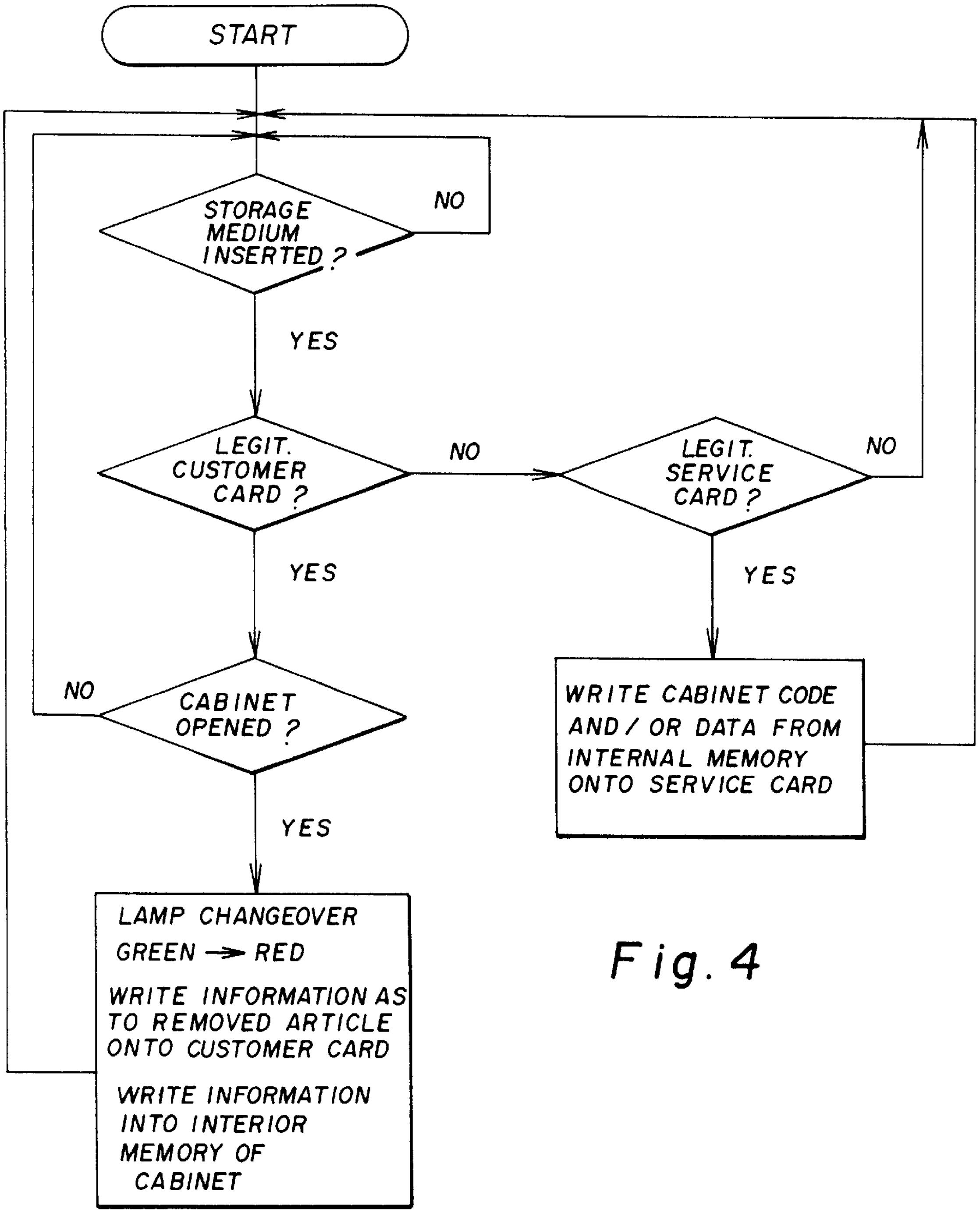
FIG. 4 is a flow chart of the method in accordance with the invention.

Referring now to FIG. 4 there is illustrated a flow chart of the method in accordance with the invention. In this arrangement firstly a check is made as to whether a storage medium has been inserted in the cabinet 1 or slot 4. If no storage medium has been inserted, this check is repeated. If, however, a storage medium has been inserted it is first checked to see whether the item involved is a legitimate customer card. If it is, then a check is made to see whether the cabinet 1 has been opened, this involving initially a changeover from the green lamp 18*a* to the red lamp 18*b*. In addition, the information as to the article removed from the cabinet 1 is written onto the customer card. In conclusion this information is also written further into the internal memory of the cabinet 1, after which the process reverts back to the starting point.

Should the previous step in checking the storage medium indicate that the customer card is not legitimate, then a check is made to see whether the card is a legitimate service card. If this is also not the case, then the process reverts back to the starting point.

If however, a legitimate service card is inserted, the cabinet code and/or the data from the internal memory of the cabinet 1 are written on the service card. The process then reverts back to the starting print.

For invoicing, the customer card is presented e.g. at the reception desk where the information contained on the card is read so that a speedy and simple invoicing of the articles removed from the cabinet can be implemented.

A person charged with the task of restocking the cabinet can make use of his service card to gain access to other cabinets to store on this service card further information as to which articles have been removed from these other cabinets or to use the service card in central stores to establish which articles are needed for restocking the indicated cabinets.

What is claimed is:

1. A method for removal of articles from a cabinet, comprising the steps of:

a) inserting a customer data storage medium into a device for receiving the customer data storage medium;

b) selecting specific articles;

c) removing the selected articles from compartments; and d) registering information as to the selected or removed articles on the customer data storage medium;

e) storing said information in said cabinet;

f) transferring said information onto a service storage medium in conjunction with restocking said cabinet; and g) tracking information on how often each of the compartments are opened.

2. This method as set forth in claim 1, wherein each storage medium is inserted into said cabinet.

3. The method as set forth in claim 1 or 2, further comprising the step of registering said information on how often each compartment has been opened on said service storage medium.

4. The method as set forth in claim 1 or 2, wherein said compartments are arranged on a rotary platform and can be rotated by means of a selection device.

5. The method as set forth in claim 1 or 2, wherein each of the compartment is opened by means of a release device.

6. The method as set forth in claim 1 or 2, wherein said step of registering said information as to said articles removed from said cabinet uses sensors.

7. The method as set forth in claim 1 or 2, further comprising the step of giving an indication as to whether articles have been vended from said cabinet using a display device.

8. A cabinet comprising:

compartments for accommodating articles;

at least one opening for removing an article;

a closure device;

registering means for establishing information as to articles selected or removed from the compartments;

means for receiving a customer data storage medium; and a control device for storing said information, for registering said information on said customer data storage medium, for transferring said information onto a service storage medium, and for tracking a number of opening actions for each of the compartments.

9. The cabinet as set forth in claim 8, further comprising a cooling assembly.

10. The cabinet as set forth in claim 8 or 9, wherein said compartments are arranged on at least one rotary platform.

11. The cabinet as set forth in claim 10, wherein two rotary platforms are arranged one above the other.

12. The cabinet as set forth in claim 8 or 9, further comprising viewing windows.

13. The cabinet as set forth in claim 8 or 9, wherein said control device registers said information on a chip card.

14. The cabinet as set forth in claim 8 or 9, further comprising sensors which provide information as to articles contained in or removed from said cabinet.

15. The cabinet as set forth in claim 8 or 9, further comprising a display device displaying said information stored in said cabinet.

16. The cabinet as set forth in claim 8 or 9, further comprising a display having a red lamp for indicating that article removal has occurred and a green lamp indicating that article removal has not occurred.

17. The cabinet as set forth in claim 8 or 9, further comprising a storage medium in which said control device stores said information as to articles selected or removed and said number of opening actions for each of the compartments.

* * * * *